L. WOLF.
METHOD OF AND APPARATUS FOR MAKING LIQUID GAS.
APPLICATION FILED DEC. 29, 1910.
1,000,655.
Patented Aug. 15, 1911.
2 SHEETS—SHEET 1.
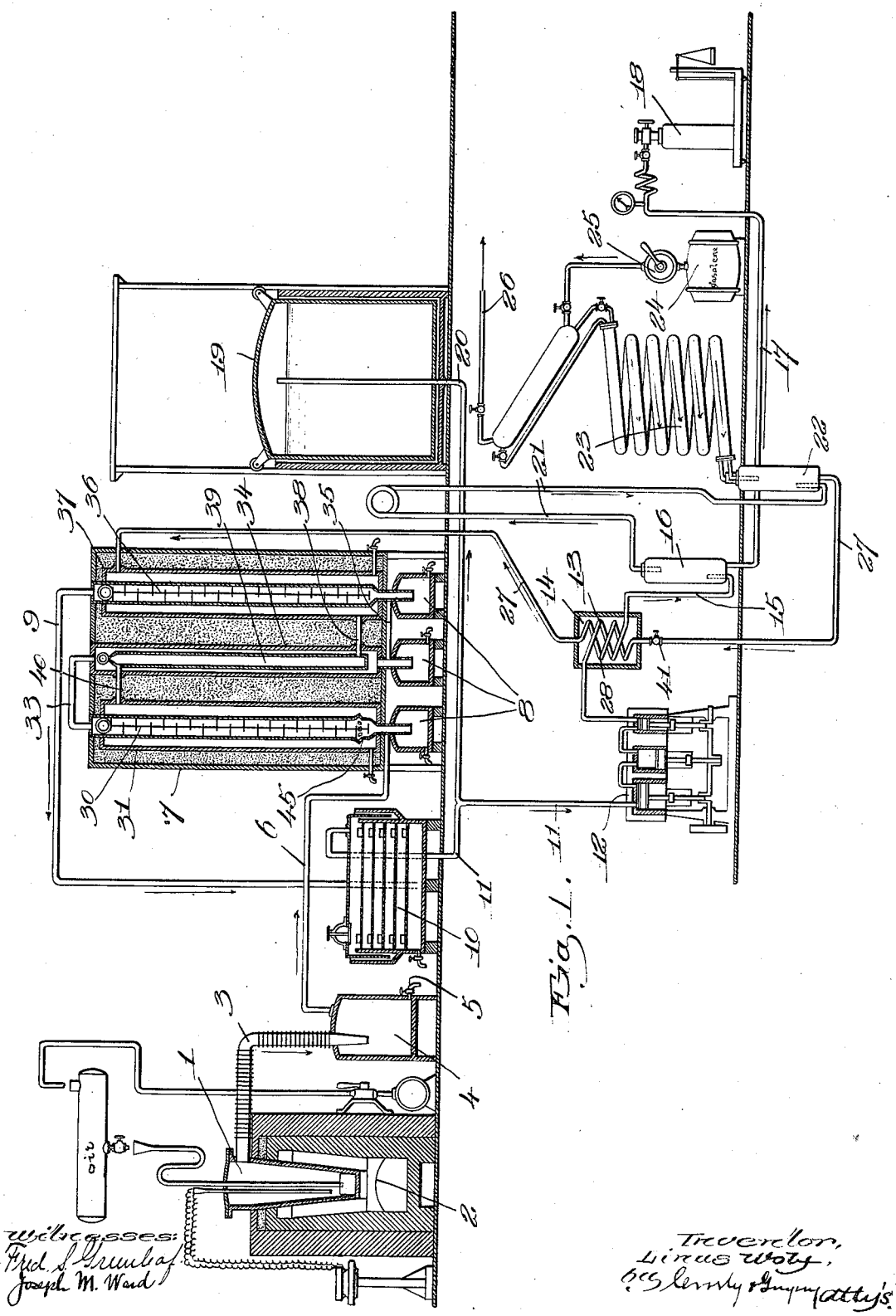

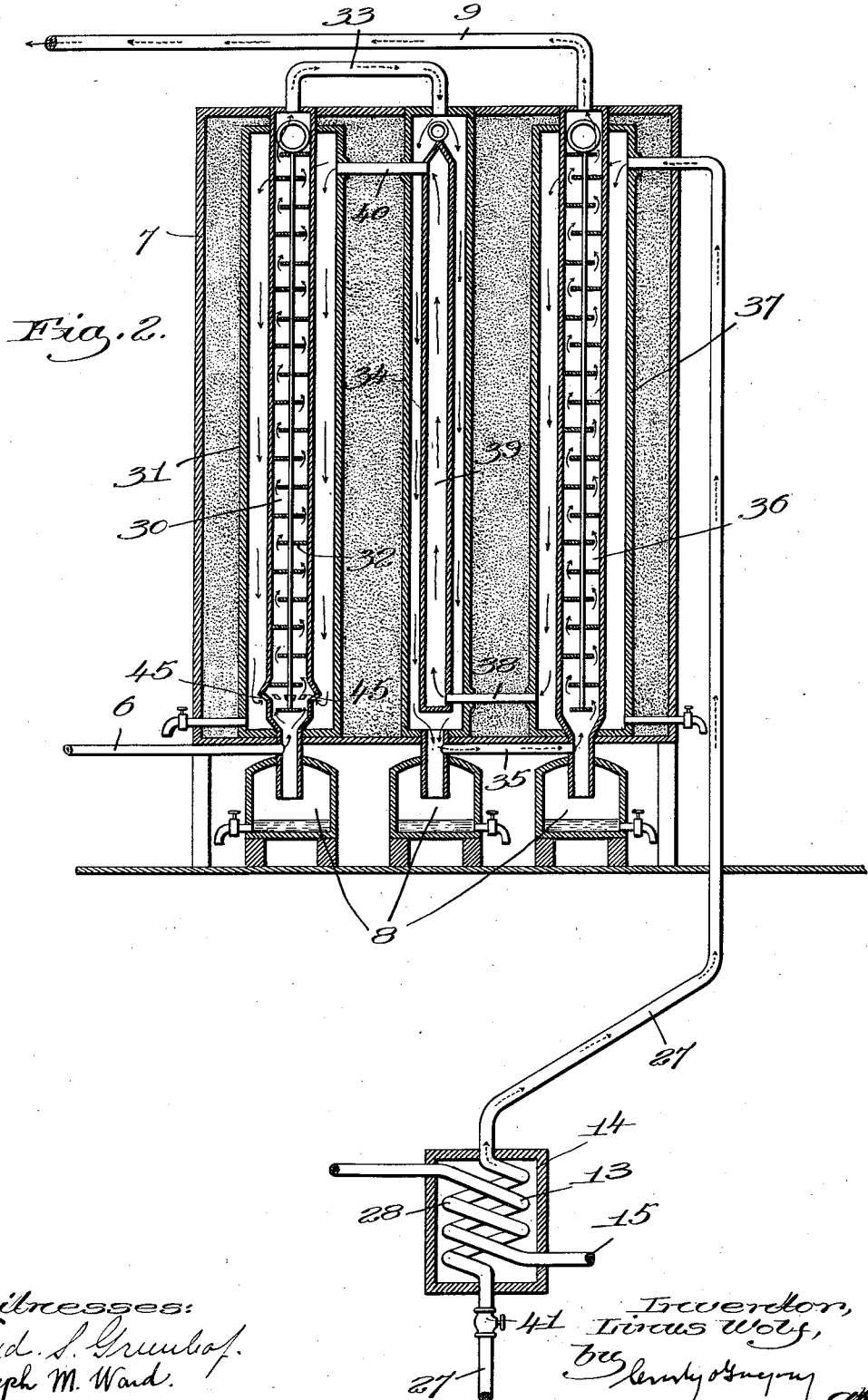

UNITED STATES PATENT OFFICE.

LINUS WOLF, OF ZURICH, SWITZERLAND, ASSIGNOR TO SCHWEIZERISCHE FLUSSIG-GAS-FABRIC L. WOLF A. G., OF ZURICH, SWITZERLAND, A FIRM.

METHOD OF AND APPARATUS FOR MAKING LIQUID GAS.

1,000,655.      Specification of Letters Patent.      Patented Aug. 15, 1911.

Application filed December 29, 1910. Serial No. 599,947.

*To all whom it may concern:*

Be it known that I, LINUS WOLF, a subject of the Emperor of Germany, and resident of Zurich, in Switzerland, have invented an Improvement in Methods of and Apparatus for Making Liquid Gas, of which the following description, in connection with the accompanying drawing, is a specification, like characters on the drawing representing like parts.

This invention relates to a method of making so-called "liquid gas" and is in the nature of an improvement on the method described and claimed in my Patent No. 928,729, July 20, 1909.

The term "liquid gas" is used in the trade to designate a liquefied gas containing liquid hydrocarbon constituents of distillation gases which are entirely free from such constituents as can be liquefied at atmospheric pressure and at a comparatively low temperature, these latter constituents being somewhat in the nature of gasolene or naphtha. Liquid gas will remain in its liquefied state so long as it is held under a heavy pressure, but when the pressure is reduced it will rapidly assume the gaseous form without leaving any liquid residue.

The characteristic features of liquid gas may be readily determined by reference to my aforesaid Patent No. 928,729. According to the method disclosed in said patent for manufacturing liquid gas, the distillation gases while at substantially atmospheric pressure are cooled to a marked degree sufficient to liquefy all those hydrocarbon constituents of the distillation gases which include the easily-vaporizable liquid hydrocarbons, such as gasolene or naphtha, and then such liquefied constituents are separated from the remaining distillation gases and all of the liquefiable constituents of the latter are then liquefied thereby producing the liquid gas. In order to liquefy and remove from the distillation gases the easily-vaporizable liquid hydrocarbons, the apparatus shown in said patent comprises a cooling device in which the distillation gases are cooled by the cooling effect due to the expansion and vaporization of highly-compressed vaporizable hydrocarbon in liquid form, and after the cooling medium has done its work it is delivered to and commingled with the cooled distillation gases. There is, however, more or less cooling effect left in the cooling medium after it has passed through the cooling apparatus, and in the construction shown in said patent this cooling effect of the cooling medium is lost.

My present invention aims to provide an improved process by which the maximum cooling effect can be secured by means of the cooling medium, and I accomplish this by introducing the cooling medium which has passed through and done its work in the cooling apparatus directly to the body of distillation gases before or while the latter are being subjected to the cooling process, so that the cooling medium by commingling with the distillation gases augments the cooling effect of the cooling apparatus.

The particular character of the apparatus used in carrying out my improved process is not of any moment as the constructional details of the apparatus might be varied in many ways while still permitting the improved process to be practiced.

In order to give a more complete understanding of the invention I have illustrated in the drawings one apparatus by which the process can be carried out, but I wish it understood, however, that the process is not confined in its use to an apparatus such as illustrated.

Before describing the process in detail, I will refer briefly to the illustrated apparatus which in many respects is similar to the apparatus shown and described in my Patent No. 928,729.

Figure 1 is a diagrammatic view of the apparatus as a whole; Fig. 2 is a sectional view showing the cooler.

1 designates a retort which is associated with a suitable furnace 2 and in which distillation gases may be produced in well-known way from crude oil, petroleum, bitumen, or other similar raw material. The distillation gases produced in the retort are taken through a pipe 3 into a tank or receptacle 4 in which the tar and other similar heavy products are condensed, and from which they may be drawn off by a suitable valve 5. From the tank 4 the distillation gases pass through a pipe 6 to the cooler designated generally by 7 and in which they are cooled to a sufficiently low temperature so that the constituents thereof comprising the easily-vaporizable liquid hydrocarbons become liquefied, such constituents as do become liquefied in the cooler becoming separated from the gases and collected in receptacles 8 from which they may be drawn off. The detailed construction and operation of the cooler will be more fully hereinafter described. The cooled gases come from the cooler through a pipe 9 and are delivered to a washer or purifier 10 of any suitable construction and from the purifier the gases are lead through a pipe 11 to a compresser 12 which is adapted to compress the gases to a point sufficient to liquefy the remaining constituents thereof with the exception of the permanent gases. I find in practice that a pressure of 1500 pounds is sufficient for this purpose. The compressed gases are led from the compressor through a cooling coil 13 located in a cooler 14 and in which they become liquefied, such gases passing from the cooler through a pipe 15 to a tank or container 16 in which the liquid gas collects. The liquid gas is led from the container 16 through a pipe 17 to a receptacle 18 in which it may be transported.

19 is a gasometer connected by a pipe 20 with the pipe 11, said gasometer acting as a balance to control the pressure.

The operation of the parts thus far described is the same as that of the corresponding parts in my above-mentioned patent and a further description thereof is not necessary.

There are in distillation gases certain constituents known commonly as permanent gases and which are extremely hard to liquefy. Such permanent gases are taken from the container 16 through a pipe 21 to an auxiliary container 22 which latter is connected with a coil 23 adapted to contain gasolene or other carbureting hydrocarbon. This gasolene is shown as being delivered to the coil from a tank or other source of supply 24 by means of a pump 25. As a result the auxiliary container 22 will be filled with this gasolene. The permanent gases which are delivered through the pipe 21 carry with them a certain proportion of the hydrocarbon constituents properly belonging with the liquid gas, and these are washed out from the permanent gases as they pass through the gasolene or other carbureting oil. The unliquefied gases may be finally delivered through a pipe 26 to a gasometer or any other suitable receptacle.

27 is a pipe connecting with the bottom of the auxiliary container 22 and extending to the cooling device by which the distillation gases are cooled, a portion of said pipe preferably being formed into a cooling coil 28 situated in the cooler 14.

The cooling apparatus 7 is best seen in Fig. 2 and it comprises three cooling chambers, although this construction is not at all essential to the carrying out of my process. The first cooling chamber is shown at 30 and it is situated within a casing 31 in which the cooling medium circulates so that the cooling medium entirely surrounds the cooling chamber 30. The pipe 6 leads into the lower end of the chamber 30 so that the distillation gases pass upwardly through said chamber, as shown by the arrow, and said chamber will preferably be provided with baffle-plates 32 to retard the flow of gas. The upper end of the chamber 30 is connected by a pipe 33 with a chamber 34, and the lower end of the chamber 34 is connected by a pipe 35 with another cooling chamber 36 similar to the cooling chamber 30, said chamber 36 being connected at its upper end with the pipe 9 which leads to the purifier. The cooling chamber 36 is situated inside of a casing 37 to which the pipe 27 is connected at its upper end thereby to deliver the cooling medium thereto. The casing 37 is connected at its lower end by a pipe 38 with a chamber 39 situated within the chamber 34, the upper ends of the chamber 39 being connected by a pipe 40 with the interior of the casing 31. The pipe 27 has a valve 41 therein to control the flow of the cooling medium therethrough.

In the operation of the device when the valve 41 is opened more or less the highly-compressed gasolene or other carbureting oil in the auxiliary container 22, which oil has some of the permanent gases compressed therein, is delivered to the casing 37 wherein it expands and vaporizes, thus producing a marked cooling effect on the gases passing through the cooling chamber 7. The cooling medium in the casing 37 continues to pass through the chamber 39 and into the casing 31, and during its passage there is a constant expansion and vaporization thereof and a consequent cooling effect produced. The flow of the cooling medium is in an opposite direction to that of the distillation gases and the cooling effect produced by this apparatus is sufficient to reduce the temperature of the distillation gases in the cooling chambers 30, 34 and 36 to a point where the easily-vaporizable liquid hydrocarbons, such, for instance, as gasolene or naphtha, become liquefied, such liquefied constituents draining out through the lower open ends of the cooling chambers into the vessels 8. The result is that the distillation gases which are delivered from the cooler 7 through the pipe 9, and which form the basis of liquid gas, are entirely free from these easily-vaporizable liquid hydrocarbons.

The process thus far described is similar in all its essential features to the process described in my aforesaid patent. In said patent, however, the gaseous portion of the cooling medium after passing through the cooler is delivered to the distillation gases after the latter have been subjected to the cooling operation. I find, however, that after the cooling medium has done its work in the cooler 7, there is still considerable cooling virtue left therein, and by the present invention I provide for making use of this in such a way that the cooling effect of the cooler 7 may be augmented thereby. I secure this end by delivering the cooling medium which has passed through the cooler directly to the distillation gases at the time that the latter are delivered to the cooler. This may be easily accomplished by providing the chamber 30 with apertures 45 at its lower end within the casing 31 so that after the cooling medium has passed downwardly in said casing, as shown by the arrow, the gaseous portion thereof will pass through the apertures 45 into the chamber 30, in which chamber the cooling medium becomes commingled with the distillation gases. After the cooling medium, therefore, has done its work in reducing the temperature of the distillation gases so far as this is possible where the cooling medium is passing through a different chamber from the distillation gases, said cooling medium is delivered directly to the distillation gases before the latter are subjected to the cooling process, and the commingling of this cooling medium with the distillation gases produces an additional cooling effect which is of great advantage in the carrying out of the process.

My improvement is especially useful in starting up plants for the production of liquid gas.

As stated above, the apparatus employed for carrying out my improvement, that is, the particular way in which the cooling medium is delivered to the distillaton gases after the former has done its work in the cooler, is not essential to the invention, although the apparatus herein shown is a practical and efficient one for this purpose.

Having fully described my invention, what I claim as new and desire to secure by Letters Patent is:—

1. The process of making a liquefied gas from distillation gases which consists in cooling the distillation gases by subjecting them to the cooling effect due to the expansion and vaporization of highly-compressed vaporizable hydrocarbon fluid and then introducing the expanded and vaporized hydrocarbon into the distillation gases to be cooled before the latter are subjected to the cooling process.

2. The method of making liquid gas which consists in passing distillation gases through a cooling chamber, subjecting said distillation gases while passing through said chamber to the cooling effect due to the expansion and vaporization of highly-compressed vaporizable hydrocarbon fluid, and then introducing the expanded and vaporized hydrocarbon cooling medium into the distillation gases before the latter are subjected to the cooling process.

3. An apparatus for making liquid gas comprising means to produce distillation gases, means to cool said gases by the cooling effect due to the expansion and vaporization of highly-compressed liquid hydrocarbon, and means to deliver the expanded and vaporized hydrocarbon after the same has been used for cooling the gas to the distillation gases before the latter are subjected to the cooling operation.

In testimony whereof, I have signed my name to this specification, in the presence of two subscribing witnesses.

LINUS WOLF.

Witnesses:
LENNART AKESSON,
ARTHUR J. BUNDY.